US006427921B1

(12) United States Patent
Dlugos

(10) Patent No.: US 6,427,921 B1
(45) Date of Patent: Aug. 6, 2002

(54) HIDDEN INFORMATION ON A DOCUMENT FOR AUTHENTICATION

(75) Inventor: Daniel F. Dlugos, Huntington, CT (US)

(73) Assignee: Pitney Bowes Inc., Stamford, CT (US)

(*) Notice: Subject to any disclaimer, the term of this patent is extended or adjusted under 35 U.S.C. 154(b) by 0 days.

(21) Appl. No.: 09/683,368

(22) Filed: Dec. 19, 2001

Related U.S. Application Data

(63) Continuation-in-part of application No. 09/741,496, filed on Dec. 19, 2000.

(51) Int. Cl.[7] .......... G06K 19/06

(52) U.S. Cl. .......... 235/494; 235/487

(58) Field of Search .......... 235/494, 487

(56) References Cited

U.S. PATENT DOCUMENTS 6,279,830 B1 * 8/2001 Ishibashi .......... 235/494

* cited by examiner

*Primary Examiner*—Harold I. Pitts
(74) *Attorney, Agent, or Firm*—Ronald Reichman; Angelo Chaclas

(57) ABSTRACT

A method and system for authenticating a postage indicium on a mail piece. The method comprises the steps of providing a first pattern containing encrypted information in a printed area, engaging a mask with the printed area, wherein the mask comprises a second pattern for forming with the first pattern a third pattern indicative of the encrypted information. The method further comprises the step of comparing the third pattern with a template having stored information. If the encrypted information revealed in the third pattern matches the stored information, then the postage indicium is assumed to be an original copy and not a duplicated copy.

17 Claims, 14 Drawing Sheets n

| m \ n | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | 1 | 0 | 0 | 1 | 1 | 0 | 0 | 1 | 0 | 0 | 1 | 1 | 0 | 0 |
| 2 | 0 | 0 | 1 | 0 | 0 | 0 | 1 | 0 | 0 | 1 | 0 | 0 | 0 | 1 |
| 3 | 1 | 1 | 1 | 0 | 1 | 0 | 1 | 1 | 1 | 1 | 0 | 1 | 0 | 1 |
| 4 | 0 | 1 | 0 | 1 | 0 | 1 | 0 | 0 | 1 | 0 | 1 | 0 | 1 | 0 |
| 5 | 0 | 0 | 1 | 0 | 0 | 1 | 0 | 0 | 0 | 1 | 0 | 0 | 1 | 0 |
| 6 | 1 | 0 | 0 | 1 | 1 | 0 | 1 | 1 | 0 | 0 | 1 | 1 | 0 | 1 |
| 7 | 0 | 0 | 1 | 1 | 0 | 1 | 0 | 0 | 0 | 1 | 1 | 0 | 1 | 0 |
| 8 | 1 | 0 | 0 | 1 | 1 | 0 | 0 | 1 | 0 | 0 | 1 | 1 | 0 | 0 |
| 9 | 0 | 0 | 1 | 0 | 0 | 0 | 1 | 0 | 0 | 1 | 0 | 0 | 0 | 1 |
| 10 | 1 | 1 | 1 | 0 | 1 | 0 | 1 | 1 | 1 | 1 | 0 | 1 | 0 | 1 |
| 11 | 0 | 1 | 0 | 1 | 0 | 1 | 0 | 0 | 1 | 0 | 1 | 0 | 1 | 0 |
| 12 | 0 | 0 | 1 | 0 | 0 | 1 | 0 | 0 | 0 | 1 | 0 | 0 | 1 | 0 |
| 13 | 1 | 0 | 0 | 1 | 1 | 0 | 1 | 1 | 0 | 0 | 1 | 1 | 0 | 1 |
| 14 | 0 | 0 | 1 | 1 | 0 | 1 | 0 | 0 | 0 | 1 | 1 | 0 | 1 | 0 |

180

I (m,n)

FIG. 7A v

| u \ v | 1 | 2 | 3 | 4 | 5 | 6 | 7 |
|---|---|---|---|---|---|---|---|
| 1 | 0 | 0 | 1 | 1 | 0 | 1 | 1 |
| 2 | 1 | 0 | 0 | 1 | 0 | 0 | 0 |
| 3 | 1 | 1 | 1 | 0 | 0 | 1 | 0 |
| 4 | 0 | 0 | 0 | 1 | 1 | 1 | 1 |
| 5 | 1 | 0 | 1 | 0 | 0 | 0 | 0 |
| 6 | 0 | 0 | 1 | 0 | 0 | 1 | 1 |
| 7 | 0 | 1 | 0 | 1 | 1 | 1 | 0 |

182

J (u,v)

FIG. 7B v

| u \ v | 1 | 2 | 3 | 4 | 5 | 6 | 7 |
|---|---|---|---|---|---|---|---|
| 1 | 0 | 0 | 0 | 0 | 0 | 0 | 0 |
| 2 | 0 | 1 | 1 | 1 | 1 | 1 | 0 |
| 3 | 0 | 1 | 0 | 0 | 0 | 1 | 0 |
| 4 | 0 | 1 | 0 | 0 | 0 | 1 | 0 |
| 5 | 0 | 1 | 1 | 1 | 1 | 1 | 0 |
| 6 | 0 | 0 | 0 | 0 | 0 | 0 | 0 |
| 7 | 0 | 0 | 0 | 0 | 0 | 0 | 0 |

184

R (u,v)

FIG. 7C

HIDDEN INFORMATION ON A DOCUMENT FOR AUTHENTICATION

CROSS REFERENCE TO RELATED APPLICATIONS

This is a continuation-in-part of U.S. patent application Ser. No. 09/741,496 entitled "Hidden Information On A Mail Piece For Authentication" filed Dec. 19, 2000, incorporated herein by reference.

BACKGROUND OF INVENTION

1. Technical Field

The present invention relates generally to producing a postage indicium and other text or images on a mail piece and, more particularly, to a method and system for authenticating the postage indicium.

2. Background of the Invention

Postage metering systems have been developed which employ encrypted information that is printed on a mail piece as part of an indicium-evidencing postage payment. The encrypted information includes a postage value for the mail piece, combined with other postal data that relate to the mail piece and the postage meter printing the indicium. The encrypted information, typically referred to as a digital token or a digital signature, authenticates and protects the integrity of information, including the postage value, imprinted on the mail piece for later verification of postage payment. Since the digital token incorporates encrypted information relating to the evidencing of postage payment, altering the printed information in an indicium is detectable by standard verification procedures. Examples of systems that generate and print such indicium are described in U.S. Pat. Nos. 4,725,718; 4,757,537; 4,775,246 and 4,873,645, each assigned to the assignee of the present invention.

Presently, there are two postage metering device types: a closed system and an open system. In a closed system, the system functionality is solely dedicated to metering activity. Examples of closed-system metering devices, also referred to as postage-evidencing devices, include conventional digital and analog (mechanical and electronic) postage meters, wherein a dedicated printer is securely coupled to a metering or accounting function. In a closed system, typically, the printer is securely coupled and dedicated to the meter, and printing evidence of postage cannot take place without accounting for the evidence of postage. In an open system, the printer is not dedicated to the metering activity, freeing system functionality for multiple and diverse uses in addition to the metering activity. Examples of open system metering devices include personal-computer (PC) based devices with single/multi-tasking operating systems, multiuser applications and digital printers. An open-system metering device is a postage-evidencing device with a non-dedicated printer that is not securely coupled to a secure accounting module. An open-system indicium printed by the non-dedicated printer is made secure by including addressee information in the encrypted evidence of postage printed on the mail piece for subsequent verification. See U.S. Pat. Nos. 4,725,718 and 4,831,555, each assigned to the assignee of the present invention.

The United States Postal Service (USPS) has proposed an Information-Based Indicia Program (IBIP), which is a distributed-trusted system to retrofit and augment existing postage meters, using new evidence of postage payment known as information-based indicia. The program relies on digital signature techniques to produce for each envelope an indicium whose origin can be authenticated and content cannot be modified. IBIP is expected to support new methods of applying postage in addition to the current approach, which typically relies on a postage meter to print indicia on mail pieces. IBIP requires printing a large, high density, two-dimensional (2-D) bar code on a mail piece. The 2-D bar code encodes information and is signed with a digital signature.

The USPS has published draft specifications for IBIP. The INFORMATION-BASED INDICIA PROGRAM (IBIP) INDICIUM SPECIFICATION, dated Jun. 13, 1996, and revised Jul. 23, 1997, (IBIP Indicium Specification) defines the proposed requirements for a new indicium that will be applied to mail being created using IBIP. The INFORMATION-BASED INDICIA PROGRAM POSTAL SECURITY DEVICE SPECIFICATION, dated Jun. 13, 1996, and revised Jul. 23, 1997, (IBIP PSD Specification) defines the proposed requirements for a Postal Security Device (PSD), which is a secure processor-based accounting device that dispenses and accounts for postal value stored therein to support the creation of a new information-based postage postmark or indicium that will be applied to mail being processed using IBIP. The INFORMATION-BASED INDICIA PROGRAM HOST SYSTEM SPECIFICATION, dated Oct. 9, 1996, defines the proposed requirements for a host-system element of IBIP (IBIP Host Specification). IBIP includes interfacing user, postal and vendor infrastructures, which are the system elements of the program. The INFORMATION-BASED INDICIA PROGRAM KEY MANAGEMENT PLAN SPECIFICATION, dated Apr. 25, 1997, defines the generation, distribution, use and replacement of the cryptographic keys used by the USPS product/service provider and Pad's (IBIP KMS Specification). These specifications have been consolidated into one specification entitled PERFORMANCE CRITERIA FOR INFORMATION BASED INDICIA AND SECURITY ARCHITECTURE FOR OPEN IBI POSTAGE EVIDENCING SYSTEMS (PCIBI-0), dated Feb. 23, 2000. The specifications are collectively referred to herein as the IBIP Specifications.

The IBIP Specifications define a stand-alone, open-metering system, referred to herein as a PC Meter, comprising a PSD coupled to a personal computer (PC) which operates as a host system with a printer coupled thereto (Host PC). The Host PC runs the metering application software and associated libraries (collectively referred to herein as Host Applications) and communicates with one or more attached PSD's. The PC Meter can only access PSD's coupled to the Host PC. There is no remote PSD access for the PC Meter.

The PC Meter processes transactions for dispensing postage, registration and refills on the Host PC. Processing is performed locally between the Host PC and the PSD coupled thereto. Connections to a data center, for example, for registrations and refill transactions, are made locally from the Host PC through a local or network modem/internet connection. Accounting for debits and credits to the PSD is also performed locally, logging the transactions on the Host PC. The Host PC may accommodate more than one PSD, for example, supporting one PSD per serial port. Several application programs running on the Host PC, such as a word processor or an envelope designer, may access the Host Applications.

The IBIP Specifications do not address an IBIP open-metering system on a network environment. However, the specifications do not prohibit such a network-based system. Generally, in a network environment, a network server controls remote printing requested by a client PC on the network. Of course, the client PC controls any local printing.

One version of a network metering system, referred to herein as a virtual postage metering system, has many Host PCs without any PSD's coupled thereto. The Host PC's run Host Applications, but all PSD functions are performed on server(s) located at a data center. The PSD functions at the data center may be performed in a secure device attached to a computer at the data center, or may be performed in the Data center computer itself. The Host PCs must connect with the data center to process transactions such as postage dispensing, meter registration, or meter refills. Transactions are requested by the Host PC and sent to the data center for remote processing. The transactions are processed centrally at the data center, and the results are returned to the Host PC. Accounting for funds and transaction processing are centralized at the data center. See, for example, U.S. Pat. Nos. 4,873,645 and 5,454,038, which are assigned to the assignee of the present invention.

In U.S. Pat. Nos. 4,873,645 and 5,454,038, a virtual postage metering system and method are disclosed, wherein the postal accounting and token generation occur at a data center remote from the postage-evidencing printer. Although the data center may be a secure facility, there remain certain inherent security issues since the accounting and token generation functions do not occur in a secure device local to the postage printer. The virtual postage metering system includes a computer coupled to an unsecured printer and to a remote data metering system. The postal accounting and the token generation occur at the data center.

The data center is a centralized facility under the control of a meter vendor, such as Pitney Bowes, or the Postal Service. As such, it is regarded as secure compared to the environment where mailers handle meters directly. However, data stored at the data center is accessible to data center personnel and, therefore, at a minimum, subject to at least inadvertent modification by such personnel. Any unauthorized changes to the user and meter data stored at the data center compromises the integrity of the virtual postage metering system.

Furthermore, in the mail piece security system based on digital indicia, if the postage indicium is duplicated and produced on more than one mail piece, it is very difficult for the Postal Service to tell which, among the mail pieces having identical indicium, has the original indicium. Thus, it is advantageous and desirable to provide a method and a system for authenticating the indicium.

Other forms of authentication systems have been utilized by the prior art. For instance, document authentication systems have been developed. (As used herein the term "documents" refers to items, including but not limited to, currency, financial instruments, tickets, deeds, contracts, other legal documents, collectables, passports and visas, etc., which bear information and which have an inherent value distinct from the value of the information they bear, and/or are evidence of a right or immunity possessed by the proper holder of such documents.) One of the problems of the prior art is to produce documents that are secure against counterfeiting, and a method for authenticating such documents.

SUMMARY OF INVENTION

It is a primary object of the present invention to provide on a mail piece a postage indicium and encryption information that can be produced by a closed postage metering device, such as postage meter, or an open postage metering system, such as a personal-computer based device connected to a digital printer, wherein the encryption information is provided within the postage indicium or other areas on the mail piece so that the indicium can be authenticated based on the encryption information. Accordingly, the first aspect of the present invention is a method for authenticating a postage indicium on a mail piece. The method comprises the steps of: providing a first pattern containing hidden information in a printed area on the mail piece; and engaging a masking mechanism with the printed area for observing the first pattern, wherein the masking mechanism has a second pattern for forming with the first image a third pattern indicative of the hidden information.

It is possible that the first pattern comprises a first line pattern, the second pattern comprises a second line pattern and the third pattern comprises a Moir é pattern.

It is possible that the first pattern comprises a first color pattern, the second pattern comprises a second color pattern for color-filtering the first pattern, and the third pattern comprises a color-filtered pattern indicative of the hidden information.

It is possible that the first pattern comprises a pattern of dots, the second pattern comprises a plurality of windows for observing the dots, and the third pattern comprises a further pattern of dots indicative of the hidden information.

It is possible that the first pattern is electronically filtered for providing a first electronic pattern and second pattern is electronically produced, wherein the second pattern and the first electronic pattern are electronically compared for producing the third pattern.

Preferably, the first pattern is provided within the postage indicium, but it is possible to produce the first pattern on the mail piece outside the postage indicium.

The second aspect of the present invention is a system for authenticating a postage indicium on a mail piece. The system comprises: a mechanism for providing on a printed area a first pattern containing hidden information; and a masking mechanism, for engaging with the printed area for observing the first pattern, wherein the masking mechanism comprises a second pattern for forming with the first image a third pattern indicative of the hidden information.

It is another object of the present invention to provide on a document a mark and encryption information that can be produced by a closed metering device, such as a postage meter, or an open metering system, such as a personal-computer based device connected to a digital printer, wherein the encryption information is provided within the mark or other areas on the document so that the mark can be authenticated based on the encryption information. Accordingly, an aspect of the present invention is a method for authenticating a mark on a document. The method comprises the steps of providing a first pattern containing hidden information in a printed area on the document; and engaging a masking mechanism with the printed area for observing the first pattern, wherein the masking mechanism has a second pattern for forming with the first image a third pattern indicative of the hidden information.

The present invention will become apparent upon reading the description taken in conjunction with FIGS. 1 to 9.

BRIEF DESCRIPTION OF DRAWINGS

FIG. 7*a* is a diagrammatic representation illustrating a bit-map resulting from electronic filtering.

FIG. 7*b* is a diagrammatic representation illustrating another bit-map being used as a decryption mask for revealing the information concealed in the bit-map of FIG. 7*a*.

FIG. 7*c* is a diagrammatic representation illustrating the information revealed by the decryption mask of FIG. 7*b*.

DETAILED DESCRIPTION

Figure 1:
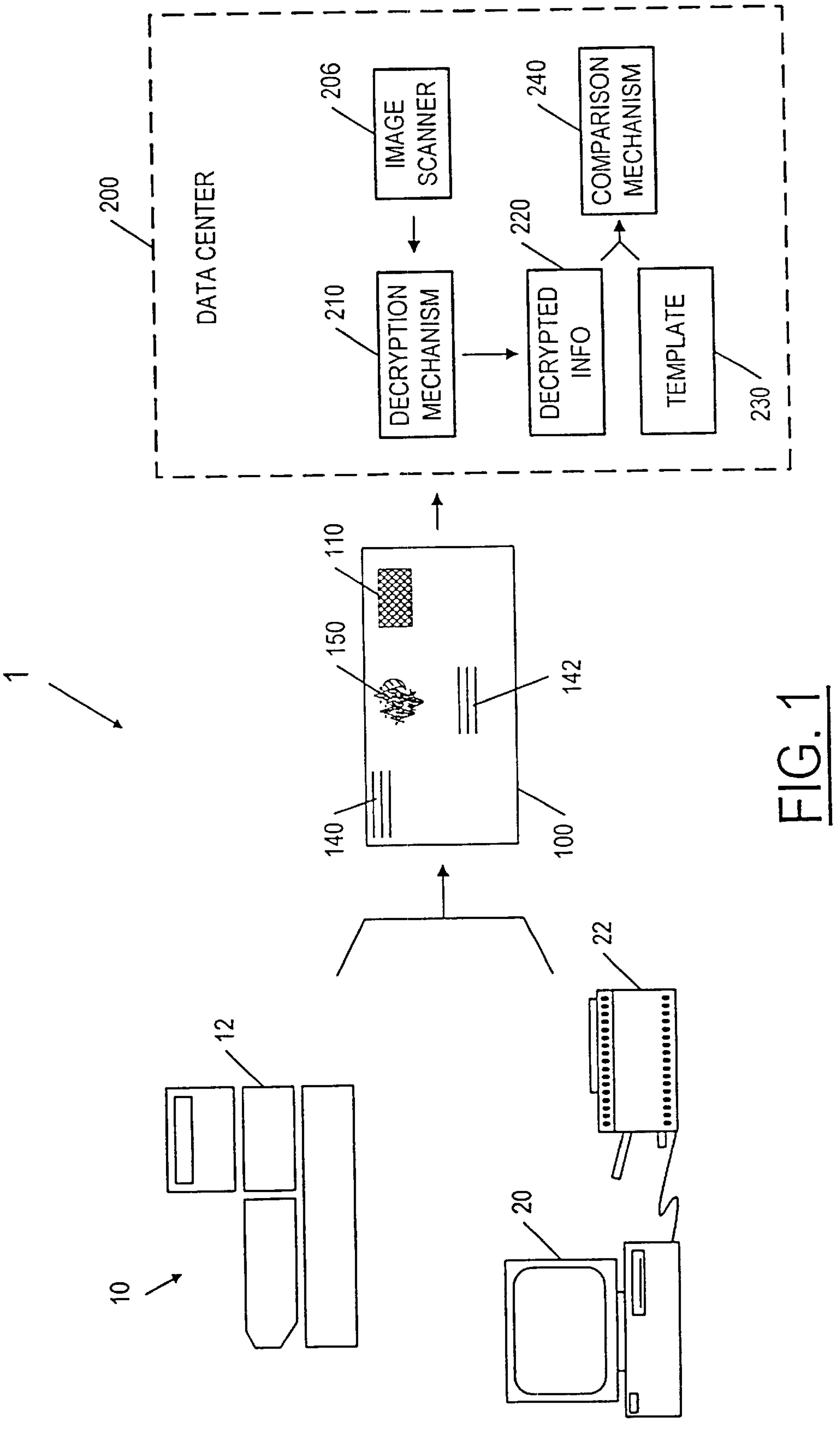
FIG. 1 is a diagrammatic representation illustrating a system for authenticating a mail piece, according to the present invention.
Figure 2:
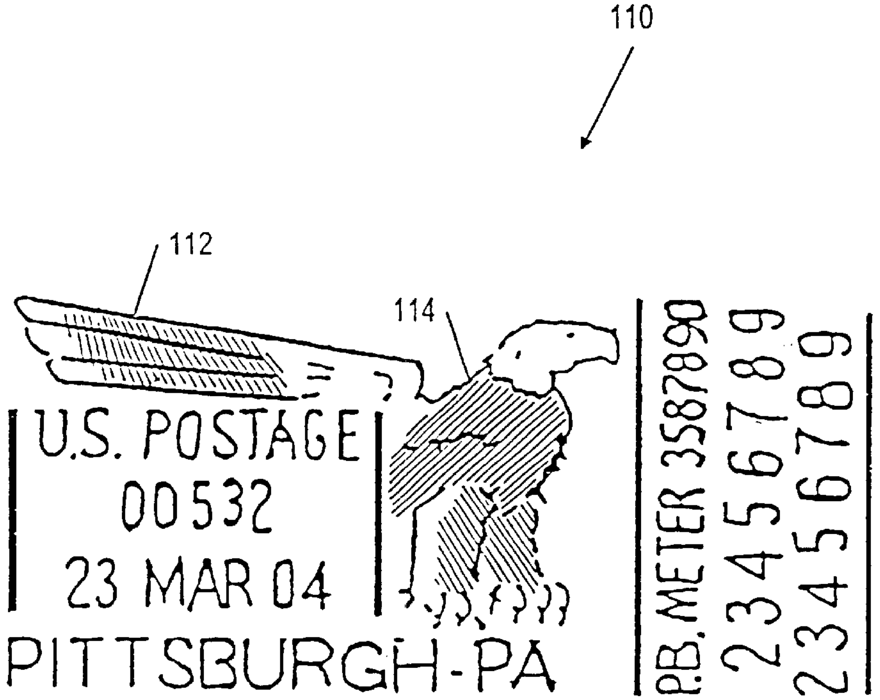
FIG. 2 is a diagrammatic representation illustrating a typical postage indicium containing hidden information.

FIG. 1 illustrates a system 1 for verifying a mail piece 100, according to the present invention. As shown, the system 1 include a postage meter 10 having a print head 12 for printing a postage indicium 110, a return address 140, a mailing address 142 or a promotional message 150 on the mail piece 100. In order to add security to the mail piece, hidden or encryption information can be provided on the mail piece 100. As shown in FIGS. 2 to 3*c*, the encryption information can be concealed in a pattern provided within the postage indicium 110. However, the encryption information can be concealed in a pattern (FIG. 5*a*, for example) provided on the return address 140, the mailing address 142, the promotional message 150 or other area on the mail piece 100, preferably in an inconspicuous fashion. Instead of the postage meter 10, a printer 22 can be connected to a Personal Computer (PC) 20 to print images or text on the mail piece 100. When the mail piece 100 reaches a data center 200, a decryption mechanism 210 is used to reveal the information 220 concealed in the pattern. The data center 200 has a template 230 containing data or images indicative of the information 220 to allow a comparison mechanism 240 to compare the information 220 as revealed by the decryption mechanism 210 to that provided in the template 230. If the comparison is successful, it can be assumed that the postage indicium 110 is not a duplicated copy. Along with other standard verification procedures, as mentioned in the background section, the encryption information can be used to authenticate the postage indicium 110.

Postage indicia are well known. As shown in FIG. 2, the postage indicium 110 can contain encryption information in different areas of the indicium 110, such as the wing section 112 and the body 114 of the bald eagle symbol. Preferably, the encryption information is provided on the mail piece in a seemingly innocuous fashion. The encryption information, as shown in FIG. 2, is hidden in a line pattern resembling the feather. Similarly, encryption information can be provided on a 2D postage indicium 110', as shown in FIG. 3*a*.

Figure 3A:
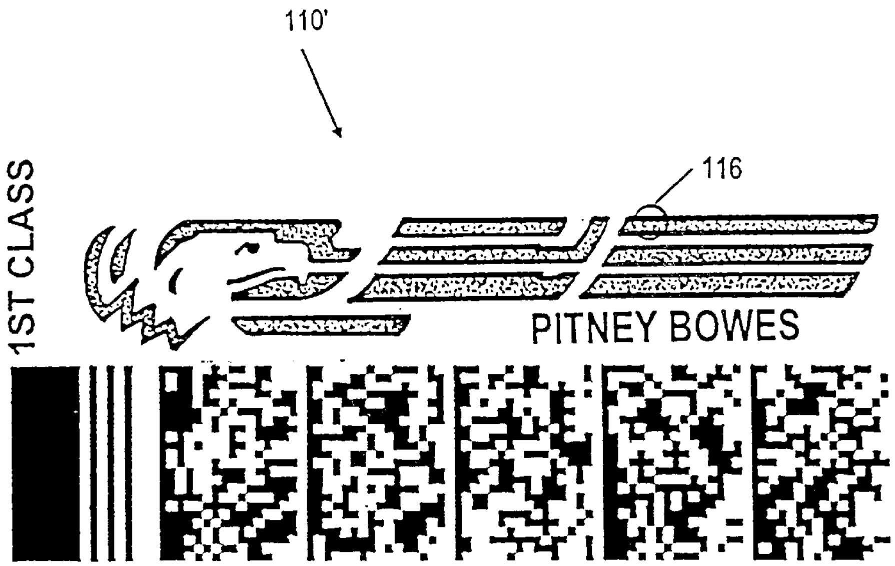
FIG. 3*a* is a diagrammatic representation illustrating a proposed 2D postage indicium containing hidden information.
Figure 3B:
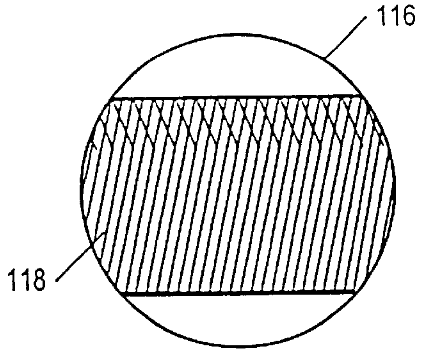
FIG. 3*b* is a diagrammatic representation illustrating a line pattern containing the hidden information provided on the 2D postage indicium.
Figure 3C:
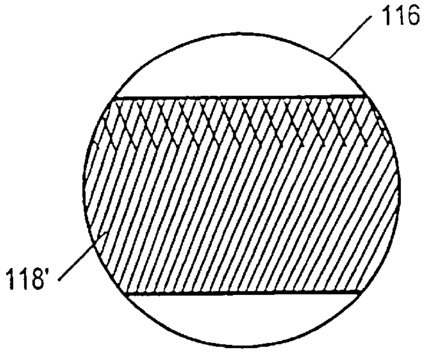
FIG. 3*c* is a diagrammatic representation illustrating a variation of the line pattern for changing the hidden information provided on the 2D postage indicium.
Figure 4B:
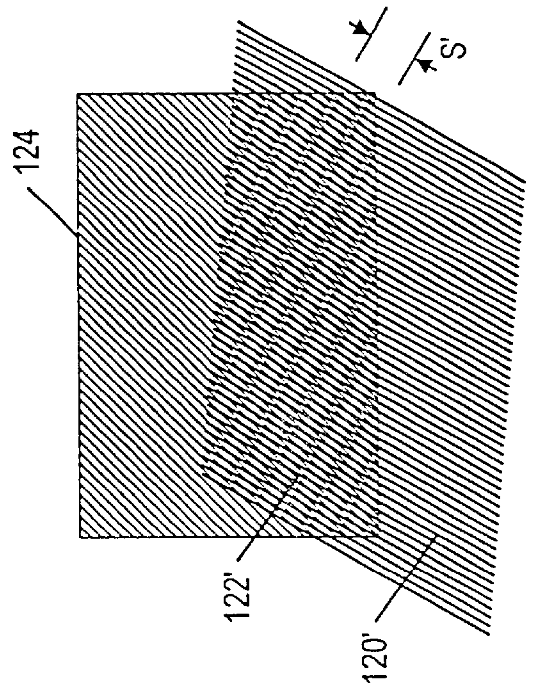
FIG. 4*b* is a diagrammatic representation illustrating the same decryption mask being used on a slightly different line pattern, revealing different encrypted information.
Figure 4A:
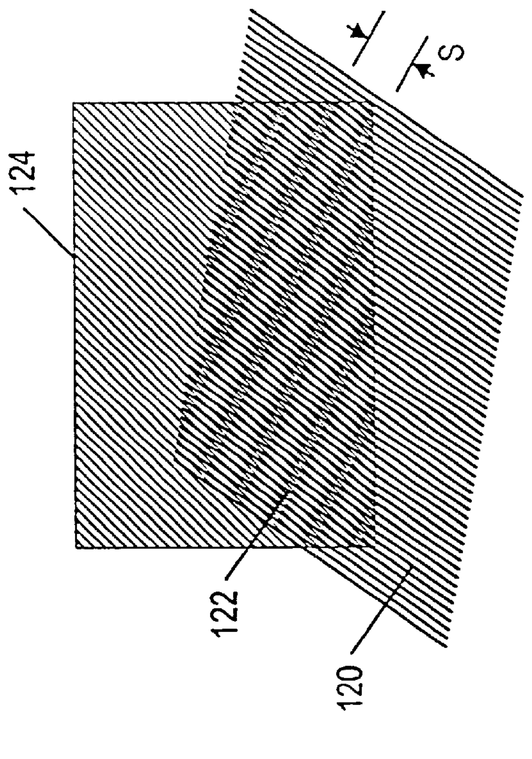
FIG. 4*a* is a diagrammatic representation illustrating a decryption mask being used on a line pattern containing encryption information for revealing the information.

As shown in FIG. 3*a*, the line pattern is provided on a section 116 of the bald eagle symbol. Preferably, the line pattern is extremely fine so that the line pattern is difficult to be reproduced with an image scanner or a photocopier. The detail of the line pattern on the section 116 is shown in FIG. 3*b*. As shown, the line pattern in the section 116 contains closely spaced, parallel straight lines 118. Preferably, the line pattern in one indicium is slightly different from another so that the hidden information in one indicium is different from the hidden information in another indicium. For example, the parallel lines 118 in the section 116 for one indicium has a certain orientation, or slope, as shown in FIG. 3*b*. In another indicium, the orientation, or slope, of the parallel lines 118' are slightly different, as shown in FIG. 3*c*. The difference in the slope can be detected by using a mask having another line pattern. It is well known that when a closely-spaced line pattern is superimposed with another similarly spaced line pattern, a Moir é pattern is formed, as shown in FIGS. 4*a* and 4*b*. As shown in FIG. 4*a*, a mask 124 containing another line pattern is used as the decryption mechanism 210 (FIG. 1) to reveal the information hidden in a line pattern 120. The hidden information, in this case, is the fringe spacing S of the Moir é pattern 122. Accordingly, the template 230 (FIG. 1) can contain an image similar to the Moir é pattern 122 or data indicative of the spacing S so as to allow the comparison mechanism 240 (FIG. 1) to compare the Moir é pattern 122 based on the fringe spacing S. In general, a slight change in the slope of the line pattern 120, relative to the slope of the line pattern in the mask 124, can result in a noticeable change in the fringe spacing S of the Moir é pattern 122. For example, the line pattern 120 can be rotated in the counter-clockwise direction by a small angle to become the line pattern 120', as shown in FIG. 4*b*. To the naked eyes, the line pattern 120' seem to be identical to the line pattern 120. However, using the same mask 124 to superimpose on the line pattern 120', one can find that the fringe spacing S of the Moir é pattern 122' is considerably smaller than the fringe spacing S of the Moir é pattern 122.

Figure 5A:
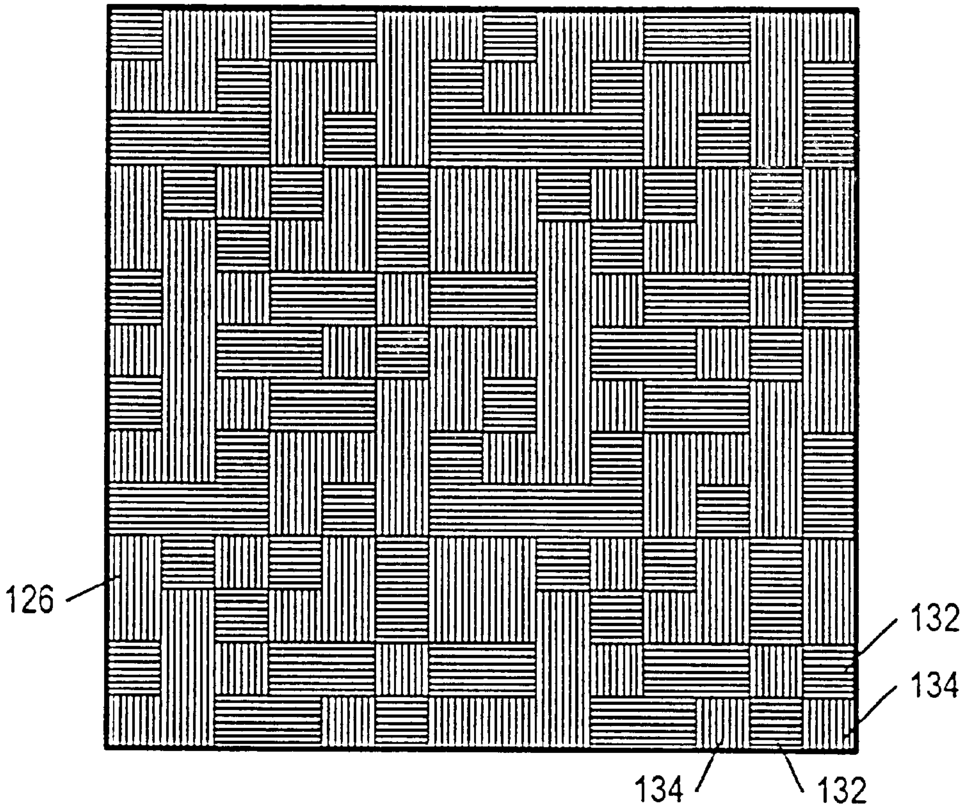
FIG. 5*a* is a diagrammatic representation illustrating a color pattern being used to conceal information.
Figure 5B:
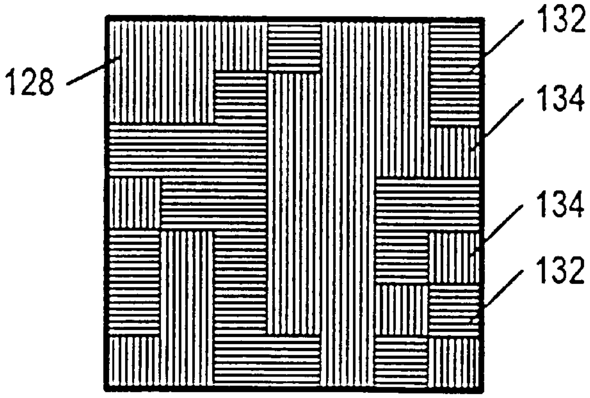
FIG. 5*b* is a diagrammatic representation illustrating a color filter being used as a decryption mask for color filtering the color pattern of FIG. 5*a* for revealing the information concealed in the color pattern.
Figure 5C:
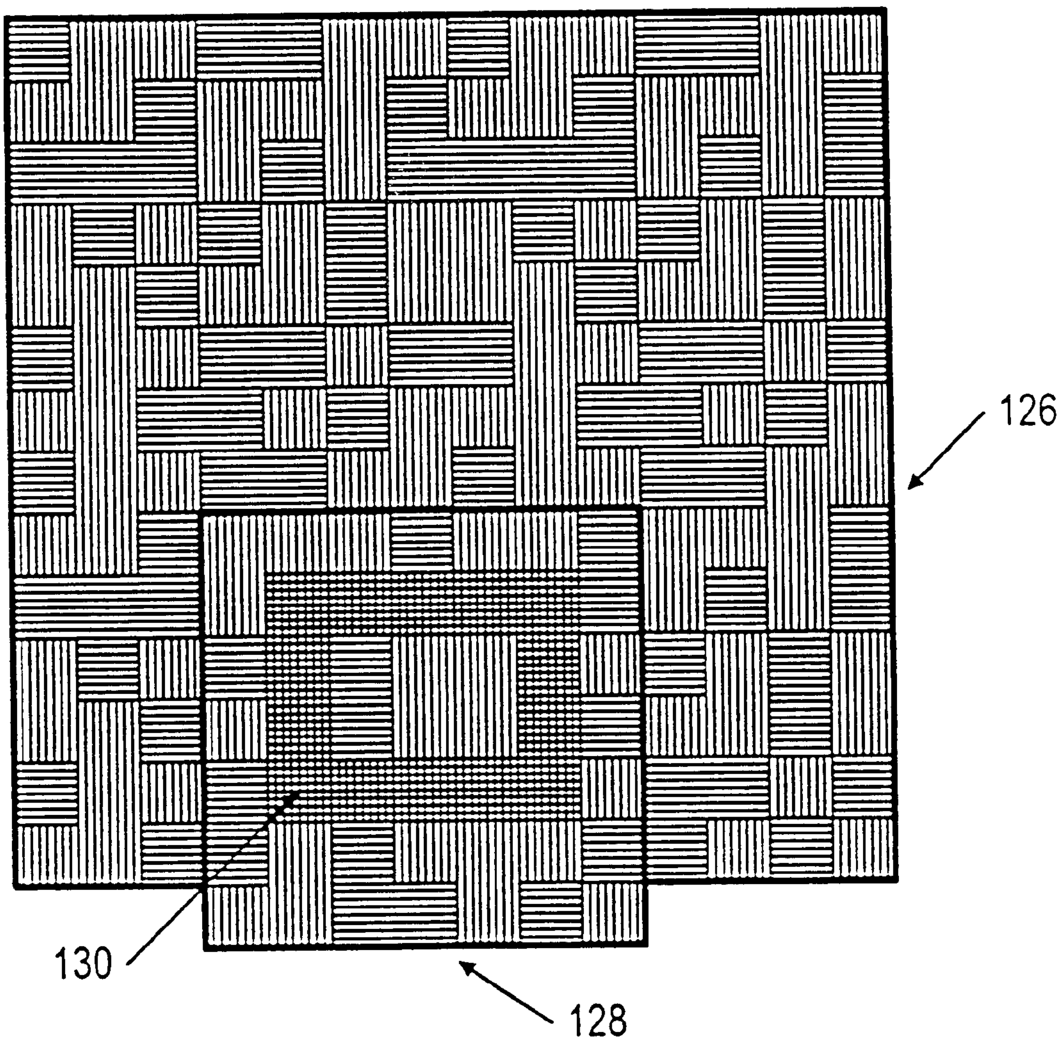
FIG. 5*c* is a diagrammatic representation illustrating the information revealed by the decryption mask of FIG. 5*b*.

FIGS. 5*a*–5*c* illustrate another form of pattern which can be used to contain encryption information. For example, a color pattern 126 consisting of a plurality of square pixels 132 and 134 is used to contain the encrypted information, as shown in FIG. 5*a*. Preferably, the color of the square pixels 132 is complementary to the color of the square pixels 134.

For example, the colors of the pixels 132 and 134 can be, respectively, blue and yellow, or green and magenta. Preferably, the colors of these pixels are very light so that the color pattern 126 can be provided as an inconspicuous background for the return address 140 or the mailing address 142 (FIG. 1), for example. A very light color pattern makes it more difficult to duplicate by a photocopier. By itself, the color pattern 126 does not show any recognizable pattern. It is well known that when a color patch in light blue is superimposed on a color patch of light yellow, the resultant color is gray. Thus, when a mask 128 containing a plurality of square pixels 132 and 134, as shown in FIG. 5*b*, is used as a decryption mechanism 220 (FIG. 1) to color filter the color pattern 126, the resulting image reveals an easily recognizable pattern, as shown in FIG. 5*c*. In this case, the information hidden in the color pattern 126 and revealed by the mask 128 is a rectangle 130 of fourteen gray pixels standing out from patches of complementary colors. Accordingly, the template 230 (FIG. 1) can contain a similar rectangular pattern or contain data indicative of such a rectangle.

Figure 6A:
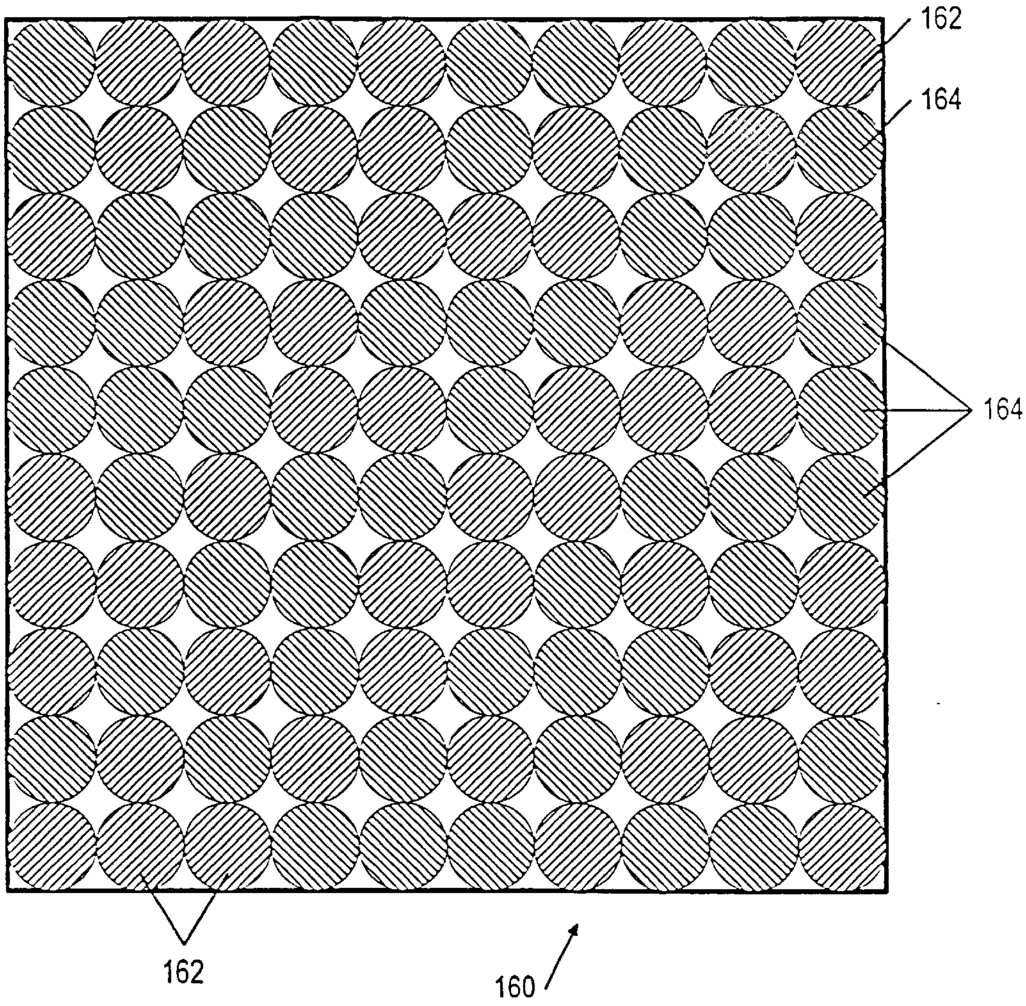
FIG. 6*a* is a diagrammatic representation illustrating a pattern of color dots being used to conceal information.
Figure 6B:
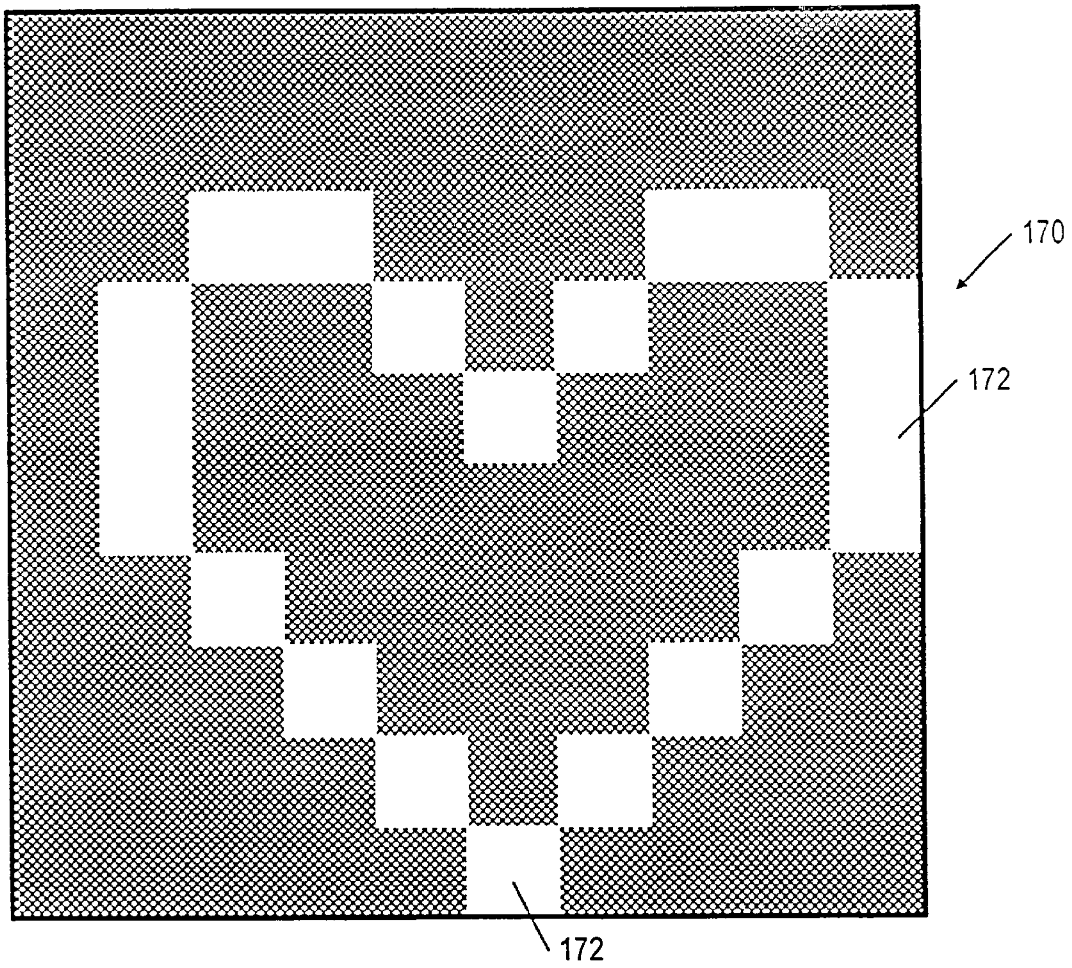
FIG. 6*b* is a diagrammatic representation illustrating a see-through being used as a decryption mask for observing the dots in the dot pattern of FIG. 6*a* for revealing the information concealed in the dot pattern.
Figure 6C:
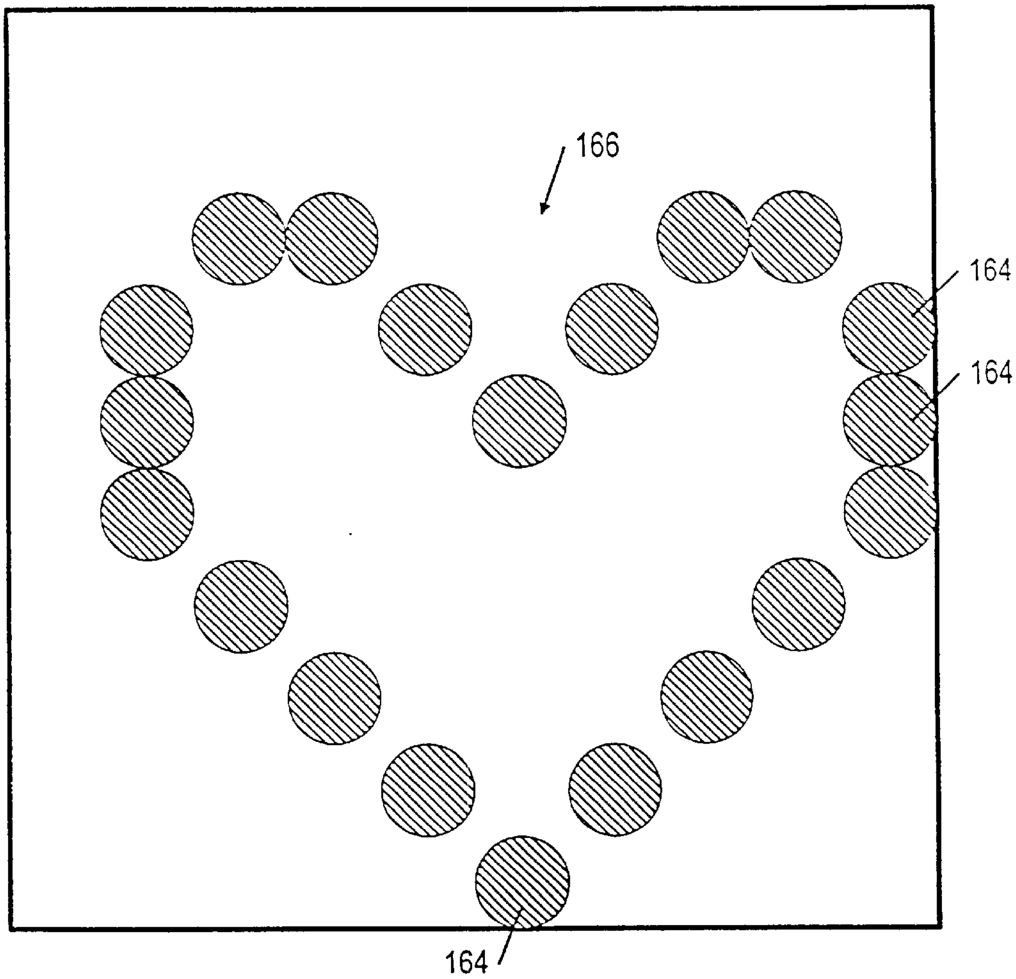
FIG. 6*c* is a diagrammatic representation illustrating the information revealed by the decryption mask of FIG. 6*b*.
Figure 6D:
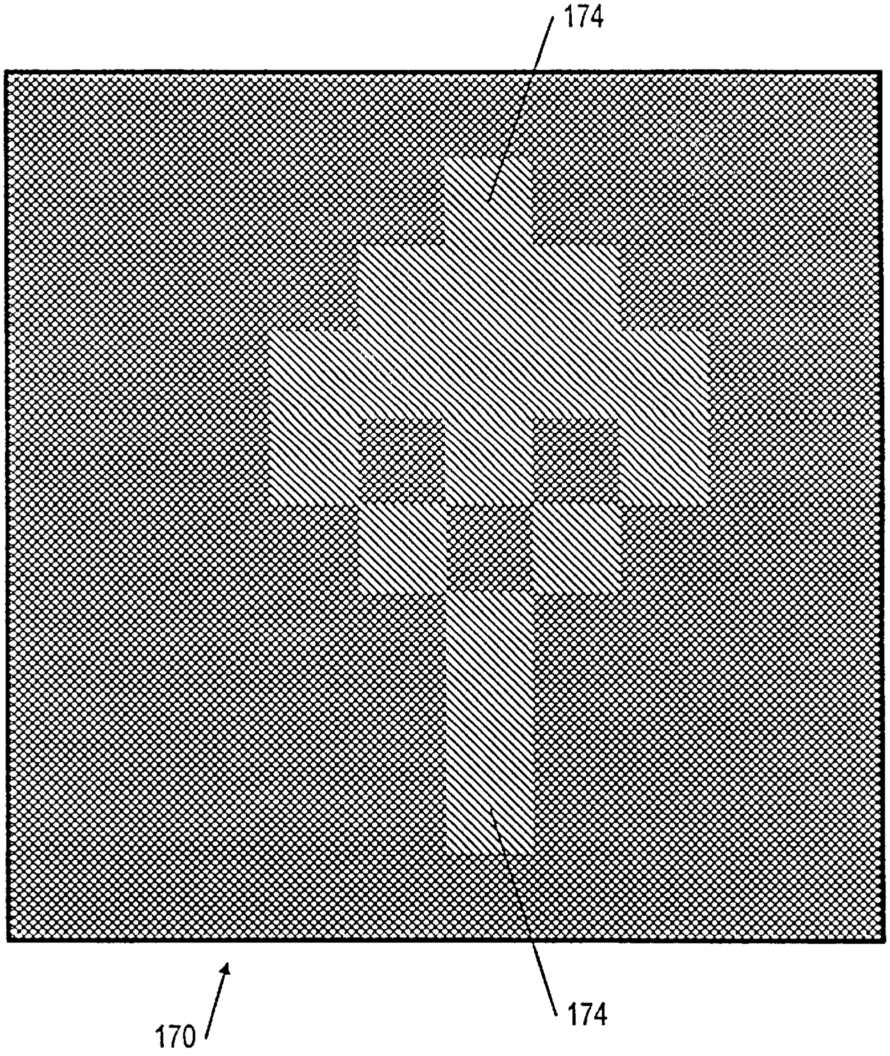
FIG. 6*d* is a diagrammatic representation illustrating another see-through mask with a color filter being used as a decryption mask for observing the dots in the dot pattern of FIG. 6*a* for revealing further information concealed in the dot pattern.
Figure 6E:
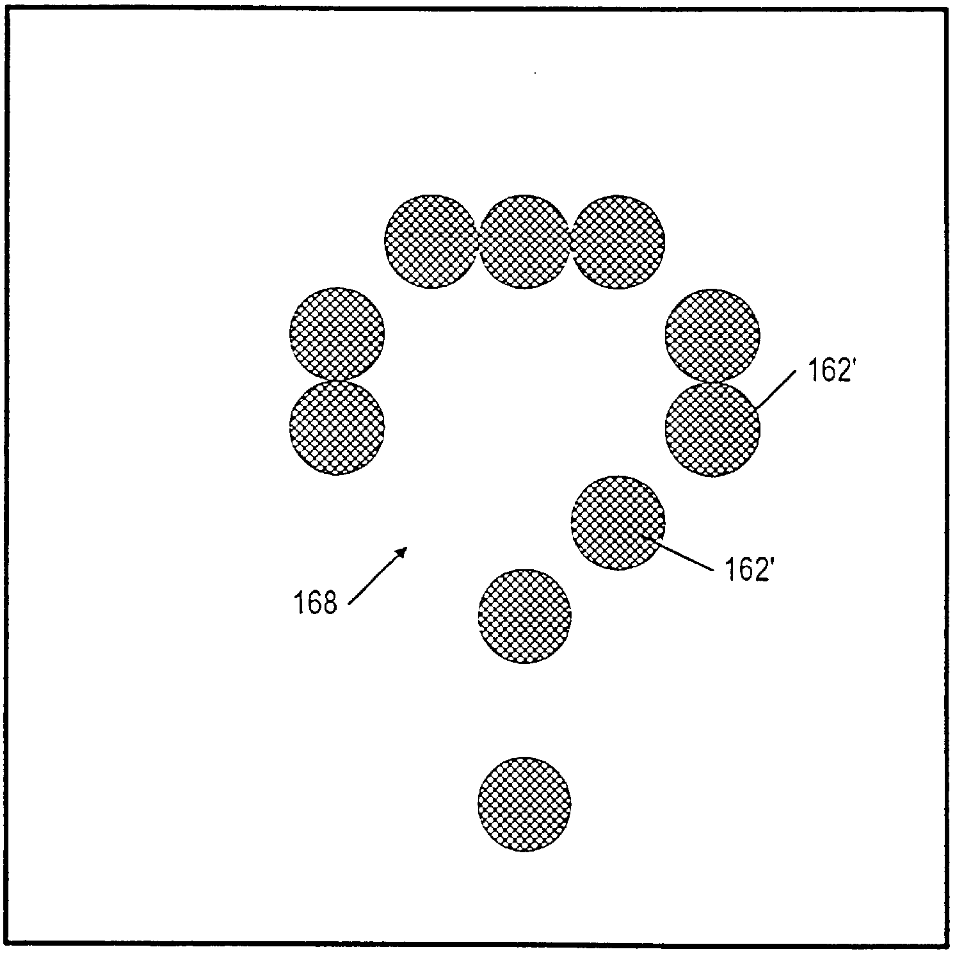
FIG. 6*e* is a diagrammatic representation illustrating the information revealed by the decryption mask of FIG. 6*d*.

FIG. 6*a* shows a dot pattern 160 having dots of two colors to conceal information. Dots of one color are denoted by reference numeral 162 and dots of the other color are denoted by reference numeral 164. As shown in FIG. 6*a*, the dots are organized in an orderly fashion. However, it is possible that the dots are randomly distributed. In order to reveal the concealed information, it is possible to use a see-through mask 170, which is basically an opaque plate having a plurality of see-through windows 172, as shown in FIG. 6*b*. When the mask 170 is laid on top of the dot pattern 160, it is expected that all the dots seen through the windows 172 are of the same color, as shown in FIG. 6*c*. As shown in FIG. 6*c*, the heart-shaped pattern 166 is composed only of color dots 164. For example, if the color of the dots 164 is red and the color of the dots 162 is cyan, then the hidden information is a heart of red dots only. Accordingly, the template 230 (FIG. 1) can simply be a red color filter for picking out any cyan dots in the revealed heart. As shown in FIG. 6*b*, the decryption mask 170 also shows the heart-shaped pattern similar to the revealed information. However, the pattern in the decryption mask can be different from the pattern in the revealed information. For example, the windows 174 in the mask 170", as shown in FIG. 6*d*, are covered with a red color filter to pick out the cyan dots 162 within the window area. When the mask 170" is laid on top of the dot pattern 160, information revealed by the mask 170" is a question mark 168 composed of black or gray dots 162', as shown in FIG. 6*e*. In this case, the pattern in the mask 170" is not the same as the pattern in the revealed information.

It should be noted that the masks 128 (FIG. 5*b*), 170 (FIG. 6*b*) and 170" (FIG. 6*d*) are physical masks. These masks must be physically put on top of a printed pattern to reveal what is hidden. However, it is possible to use an image scanner to scan the printed pattern and electronically process the scanned image into a bit-map so that a computer-generated mask can be used to electronically filter the bit-map to reveal the hidden information. For example, it is possible to turn the pattern 126, as shown in FIG. 5*a*, into a bit-map 180, as shown in FIG. 7*a*. As shown in FIG. 7*a*, color patches 132 are electronically filtered to become pixels containing the value of 1, and color patches 134 are converted into pixels containing the value of 0. The bit-map 180 is represented by a square array of pixels (m,n) having pixel values I(m,n), where m,n=1 to 14. In order to reveal the hidden information in this square array, it is possible to use a computer-generated mask 182 to electronically filter the bit-map 180. For example, a square array of pixels (u,v) having pixel values J(u,v) where u,v=1 to 7, as shown in FIG. 7*b* can be used to electrically filter the bit-map 180 using an exclusive AND operation as follows: $R(u,v)=I(m,n) \otimes J(u,v)$, with m=v+7, n=u+3, where R(u,v) is equal to 1 only when I(m,n) is the same as J(u,v). Otherwise, R(u,v) is equal to 0. For example, when u=1, v=2, m=8, n=5, we have J(1,2)=0, I(8,5)=1 and R(1,2)=0. When u=2, v=2, m=9, v=5, we have J (2,2)=0, I(9,5)=0 and R(2,2)=1. When u=3, v=2, m=10, u=5, we have J(3,2)=1, I(10,5)=1 and R(3,2)=1. When u=3, v=3, m=10, n=6, we have J(3,3)=1, I(10,6)=0 and R(3,3)=0. The bit-map 184 representing R(u,v) is shown in FIG. 7*c* and the hidden information is a plurality of pixels having the value of 1 forming a rectangle, similar to the revealed information shown in FIG. 5*c*.

Figure 8:
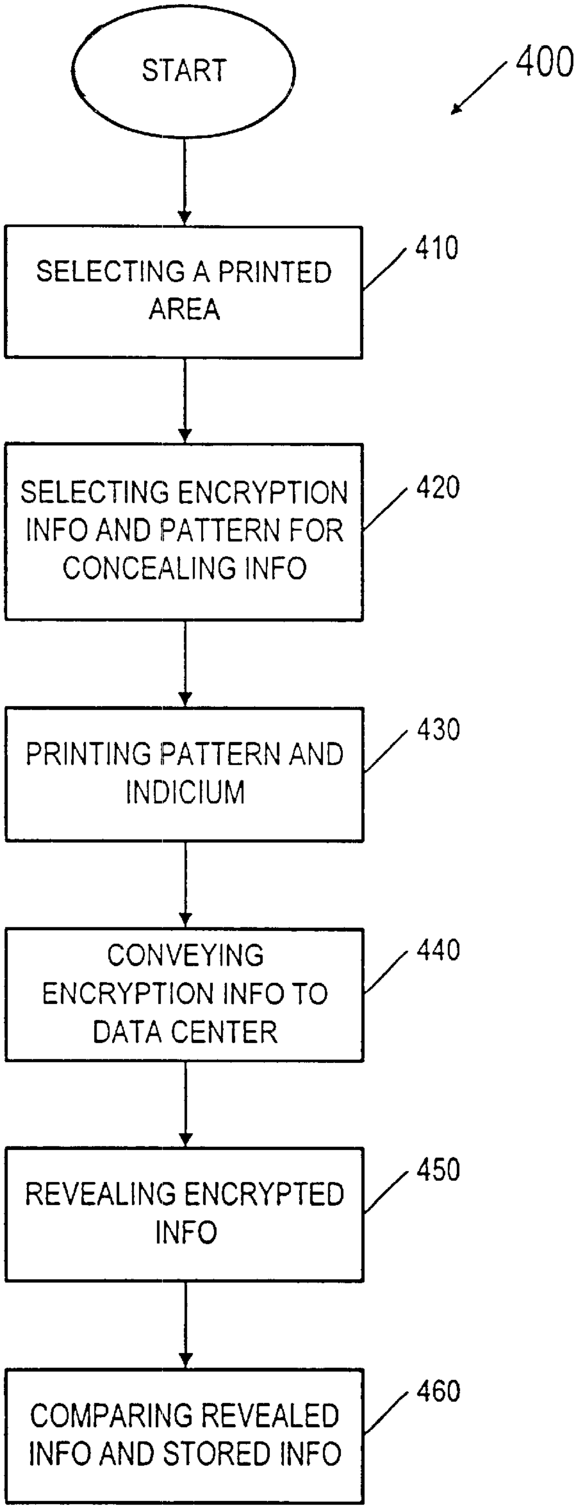
FIG. 8 is a flow chart illustrating the method of providing encryption on a mail piece for authentication purposes, according to the present invention.

The method of providing encryption information on a mail piece using a printer connected to a PC, or a postage meter having a digital print head, according to the present invention, is illustrated in a flow chart 400, as shown in FIG. 8. As shown, a software program can be used to select an area on the mail piece for providing the encryption or hidden information, at step 470. The same software program can be used to select the encryption information and the pattern to contain the encryption information, at step 420. At step 430, the postage meter prints on the mail piece an indicium and other information, along with the selected pattern. Preferably, the selected pattern is printed in a rather inconspicuous fashion so that the user of the meter does not notice such a pattern. The encryption information is conveyed to a data center at step 440, so that when the data center receive the mail piece, it can use a mask or equivalent decryption mechanism to reveal the hidden information, at step 450. The data center further compares the revealed information at step 450 to a template at step 460. Based on the comparison, the data center can determine whether the indicium is a duplicated copy or an original copy.

Figure 9:
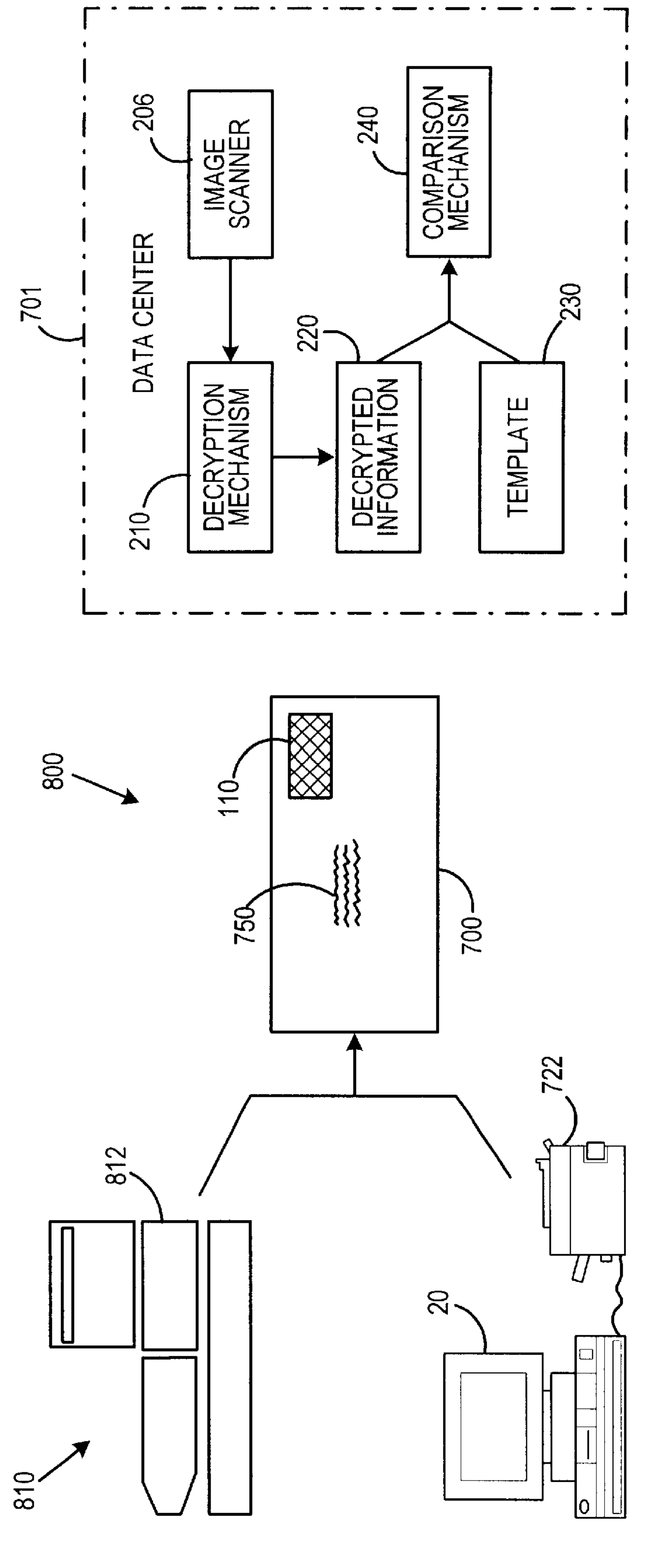
FIG. 9 is a diagrammatic representation illustrating a system for authenticating a document, according to the present invention.

FIG. 9 is an embodiment of this invention that illustrates a system 800 for verifying a document 700, according to the present invention. As shown, the system 800 include a postage meter 810 having a print head 812 for printing a postage indicium or other mark 110, and information 750 on the document 700. In order to add security to the document, hidden or encryption information can be provided on the document 700. As shown in FIGS. 2 to 3*c*, the encryption information can be concealed in a pattern provided within the mark 110. However, the encryption information can be concealed in a pattern (FIG. 5*a*, for example) provided on information 750 or other area on the document 700, preferably in an inconspicuous fashion. Instead of the postage meter 810, a printer 722 can be connected to a Personal Computer (PC) 720 to print images or text on the document 700. When the mail piece 700 reaches a data center 200, a decryption mechanism 210 is used to reveal the information 220 concealed in the pattern. The data center 200 has a template 230 containing data or images indicative of the information 220to allow a comparison mechanism 240 to compare the information 220 as revealed by the decryption mechanism 210 to that provided in the template 230. If the comparison is successful, it can be assumed that the mark 110 is not a duplicated copy. Along with other standard verification procedures, as mentioned in the background section, the encryption information can be used to authenticate the mark 110.

The present invention has been described in regard to concealing a pattern within a line pattern or a color pattern. However, there are many more ways wherein a message can be concealed within a text pattern or an image can be concealed within another image. The disclosed methods are only intended to demonstrate the principle of providing hidden information on a mail piece for authentication purposes.

Thus, although the invention has been described with respect to preferred embodiments thereof, it will be understood by those skilled in the art that the foregoing and various other changes, omissions and deviations in the form and detail thereof may be made without departing from the spirit and scope of this invention.

What is claimed is:

1. A method of authenticating a postage indicium on a mail piece having a printed area, said method comprising the steps of:

(a) providing a first pattern containing encrypted information in the printed area; and (b) engaging a decryption mechanism with the printed area, wherein the decryption mechanism comprises a second pattern for forming with the first pattern a third pattern indicative of the encrypted information.

2. A method of authenticating a mark on a document having a printed area, said method comprising the steps of:

(a) providing a first pattern containing encrypted information in the printed area; and (b) engaging a decryption mechanism with the printed area, wherein the decryption mechanism comprises a second pattern for forming with the first pattern a third pattern indicative of the encrypted information.

3. The method of claim 2, wherein the first pattern comprises a first line pattern, the second pattern comprises a second line pattern and the third pattern comprises a third line pattern.

4. The method of claim 2, wherein the third line pattern comprises fringes separated by spacings, and wherein the spacings are indicative of the encrypted information.

5. The method of claim 2, wherein the third line pattern comprises a Moir é pattern.

6. The method of claim 2, wherein the first pattern comprises a first color pattern, the second pattern comprises a second color pattern for color-filtering the first color pattern, and the third pattern comprises a color-filtered pattern indicative of the encrypted information.

7. The method of claim 6, wherein the first color pattern comprises a first plurality of color patches of a first color and a second color complementary to the first color, and the second pattern comprises a second plurality of color patches of the first color and the second color, and wherein a third color is formed when a color patch of the first color is superimposed on a color patch of the second color, and the color-filtered pattern comprises a third pattern comprising a third plurality of color patches of the third color.

8. The method of claim 2, wherein the first pattern comprises a pattern of dots and the second pattern comprises a plurality of windows for observing the dots.

9. The method of claim 8, wherein the dots have at least a first color and the third pattern comprises a plurality of dots having a second color indicative of the first color.

10. The method of claim 9, wherein the windows have a color filter to filter the first color.

11. The method of claim 2, further comprising the step of converting the first pattern into an electronic pattern, wherein the decryption mechanism comprises an electronic mask indicative of the second pattern for electronically processing the electronic pattern.

12. The method of claim 2, wherein the electronic pattern comprises a bit-map.

13. The method of claim 12, wherein the electronic mask comprises a bit-map.

14. The method of claim 13, wherein the electronic mask is computer-generated.

15. The method of claim 2, wherein the first pattern is provided on the document.

16. The method of claim 2, wherein the printed area further comprises a message area and the first pattern is provided on the message area.

17. The method of claim 2, further comprising the steps of:

(a) storing information indicative of the encryption information; and (b) comparing the stored information with the third pattern for authenticating the mark based on said comparison.

* * * * *